(12) United States Patent
Cromer et al.

(10) Patent No.: US 6,272,541 B1
(45) Date of Patent: Aug. 7, 2001

(54) DATA PROCESSING SYSTEM AND METHOD FOR DETERMINING A PHYSICAL LOCATION OF A CLIENT COMPUTER SYSTEM COUPLED TO A SERVER VIA A PHYSICAL NETWORK

(75) Inventors: Daryl Carvis Cromer, Cary; Richard Alan Dayan, Wake Forest; Howard Locker; Michael Steinmetz, both of Cary; James Peter Ward, Raleigh, all of NC (US)

(73) Assignee: International Business Machines Corporation

( * ) Notice: Subject to any disclaimer, the term of this patent is extended or adjusted under 35 U.S.C. 154(b) by 0 days.

(21) Appl. No.: 09/169,284

(22) Filed: Oct. 8, 1998

(51) Int. Cl.$^7$ .................................................. G06F 15/173
(52) U.S. Cl. .......................... 709/224; 709/224; 709/227; 709/228; 709/248; 370/338; 370/402; 370/342; 455/433; 340/825
(58) Field of Search ..................................... 709/224, 227, 709/248, 228, 250; 370/338, 342, 402; 455/433; 340/825

(56) References Cited

U.S. PATENT DOCUMENTS

| | | | |
|---|---|---|---|
| 5,479,483 | * 12/1995 | Furuya et al. | 455/433 |
| 5,533,011 | * 7/1996 | Dean et al. | 370/342 |
| 5,572,528 | * 11/1996 | Shuen | 370/402 |
| 5,991,287 | * 11/1999 | Diepstraten et al. | 370/338 |
| 6,003,092 | * 12/1999 | Waters | 709/248 |

* cited by examiner

*Primary Examiner*—Ayaz Sheikh
*Assistant Examiner*—Thu Ha Nguyen
(74) *Attorney, Agent, or Firm*—George E. Grosser; Andrew Dillon (57) ABSTRACT

A method and system are described for determining a physical location of a computer system included within a data processing system. A wireless signal is transmitted to a physical location within which a plurality of computer systems are located. In response to a receipt of the wireless signal, each computer system transmits an indication of its physical location.

24 Claims, 8 Drawing Sheets

DATA PROCESSING SYSTEM AND METHOD FOR DETERMINING A PHYSICAL LOCATION OF A CLIENT COMPUTER SYSTEM COUPLED TO A SERVER VIA A PHYSICAL NETWORK

BACKGROUND OF THE INVENTION

1. Field of the Invention

The present invention relates in general to data processing systems and, in particular, to a data processing system for determining a physical location of a computer system. Still more particularly, the present invention relates to a method and system in a data processing system for a computer system to provide an indication of its physical location in response to a receipt of a wireless signal.

2. Description of the Related Art

Personal computer systems have attained widespread use for providing computing power to many segments of today's modern society. Personal computer systems can usually be defined as a desk top, floor standing, or portable microcomputer that consists of a system unit having at least one system processor and associated volatile and non-volatile memory, a display monitor, a keyboard, one or more diskette drives, a fixed disk storage, and an optional printer. One of the distinguishing characteristics of these systems is the use of a motherboard (also known as and occasionally mentioned herein as a system board, system planar, or planar) to electronically connect these components together. These systems are designed primarily to give independent computing power to a single user and are inexpensively priced for purchase by individuals or small businesses. Examples of such personal computer systems are IBM's Intellistation and IBM's PC 300 PL and PC 300 GL.

Typically, in a business environment, many computer systems are distributed throughout various locations within the physical facilities. Keeping track of the physical location of each computer system is difficult. The difficulty in maintaining an accurate record of each computer system's current physical location greatly increases as the number of computer systems increases. Contributing to this problem is the likelihood that at least some of these computer systems will be moved from one location to another.

Significant costs are associated with asset tracking of computer systems in a large business environment. Manually locating and inventorying each individual system is typically the method used.

In some known networked computer systems, each network controller may be associated with a unique address. Utilizing the unique address of the controller, each client physically coupled to the network may be identified. However, the address of the controller is not associated with a physical location. Therefore, if the controller is moved to a new physical location, the record of the physical locations of the computer systems again becomes inaccurate.

Universal unique identifiers (UUIDs) are well known in the PC industry which may be associated with each computer system included within a data processing system. Utilizing the UUIDs, each computer system may be uniquely identified. The UUID associated with a particular computer system identifies the computer system, but not the physical location of the computer system. A manual search must be performed to determine the physical location of each computer system.

One known standard for computer systems is the Desktop Management Interface (DMI) standard from the Desktop Management Task force. The standard defines a framework for collecting and storing management information from desktop PC hardware, software, and peripherals. For example, asset and inventory information may be managed utilizing the DMI standard.

Therefore a need exists for a method and system in a data processing system for a computer system to provide an indication of its physical location.

SUMMARY OF THE INVENTION

It is therefore one object of the present invention to provide an improved data processing system.

It is another object of the present invention to provide a method and system in a data processing system for determining a physical location of a computer system.

It is yet another object of the present invention to provide a method and system in a data processing system for a computer system to provide an indication of its physical location in response to a receipt of a wireless signal.

The foregoing objects are achieved as is now described. A method and system are described for determining a physical location of a computer system included within a data processing system. A wireless signal is transmitted to a physical location within which a plurality of computer systems are located. In response to a receipt of the wireless signal, each computer system transmits an indication of its physical location.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–9 of the drawings, like numerals being used for like and corresponding parts of the accompanying drawings.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts and not as limiting upon the present invention.

The present invention is a method and system for determining a physical location of a computer system included within a data processing system. A plurality of computer systems are physically located within a physical region. A wireless signal is transmitted to the physical region. Each computer system located within the physical region receives the wireless signal. In response to the receipt of the wireless signal, each computer system located within the physical region provides an indication of its physical location.

In a typical environment, multiple physical regions will be defined. Each physical region will include a different plurality of computer systems. Each physical region also includes a transmitter associated with that physical region. The transmitter in a physical region transmits wireless radio frequency (RF) signals to the physical region within which it is located.

Those skilled in the art will recognize that there is no rigid physical demarcation between adjoining physical regions. The wireless signals transmitted to a particular physical region will vary in strength. In order to transmit a signal strong enough to reach all points within the defined physical region, the signal will also overlap and be received within a small portion of any adjoining physical regions.

Each wireless signal will include a unique identifier which identifies the transmitter which transmitted the signal. In this manner, each computer system in a physical region will receive the wireless signals transmitted by the transmitter in that physical region as well as a unique identifier which identifies the transmitter.

The present invention may be utilized to conduct several different methods of taking an inventory. One inventory method is called "inventory on demand". This method may be utilized to determine the physical locations of all computer systems, or the physical location of a particular computer system.

Another inventory method is called "inventory on entry". This method may be utilized to determine the physical locations of computer systems when a computer system is brought into a physical region. Each transmitter transmits signals which include the unique identifier associated with the transmitter. When a computer system is brought into a different physical region, the computer system compares the unique identifier received with the last wireless signal. If the most recently received unique identifier associated with a transmitter is the same as the last received unique identifier associated with a transmitter, it is determined that the computer system has not been moved into a new physical region. Therefore, the computer system does not provide an indication of physical location because it has not entered a different physical region. It has remained within the same physical region it was in when the last wireless signal was received. However, if these two unique identifiers are different, it is determined that the computer system has entered a different physical region. Therefore, the computer system will respond by transmitting an indication of its physical location.

Each computer system in the data processing system has an associated unique identifier. Utilizing a unique identifier, only one computer system is identified.

A computer system provides an indication of its physical location by transmitting a signal which includes both the unique identifier associated with that particular computer system as well as the unique identifier associated with the transmitter which transmitted the wireless signal last received by the computer system. The physical location of the computer system may then be determined by determining in which physical region the transmitter associated with the unique identifier is located. The computer system, therefore, is located within that physical region.

It is possible for more than one transmitter to be associated with a signal physical region. It is also possible for computer systems to receive wireless signals from more than one transmitter, where each transmitter is associated with a different defined physical region.

For example, one physical region may have two transmitters which transmit wireless signals to that region. In this example, one transmitter might be associated with a particular floor in a building, while the other transmitter is associated with the building. The physical region associated with the first transmitter would be the particular floor on which the first transmitter is located. The physical region associated with the second transmitter would be the entire building within which the second transmitter is located.

In this example, the computer systems located on the particular floor reside within two defined physical regions, the particular floor and the building. The computer systems would then receive two unique identifiers, one associated with the first transmitter and one associated with the second transmitter. When these computer systems respond with an indication of their physical location, the indication could include both unique identifiers, thus locating the computer on that particular floor of that building.

Those skilled in the art will recognize that one single transmitter could be associated with both a floor and a building so that only one transmitter is necessary. When one transmitter is utilized, the transmitter will transmit both a floor unique identifier and a building unique identifier.

Figure 1:
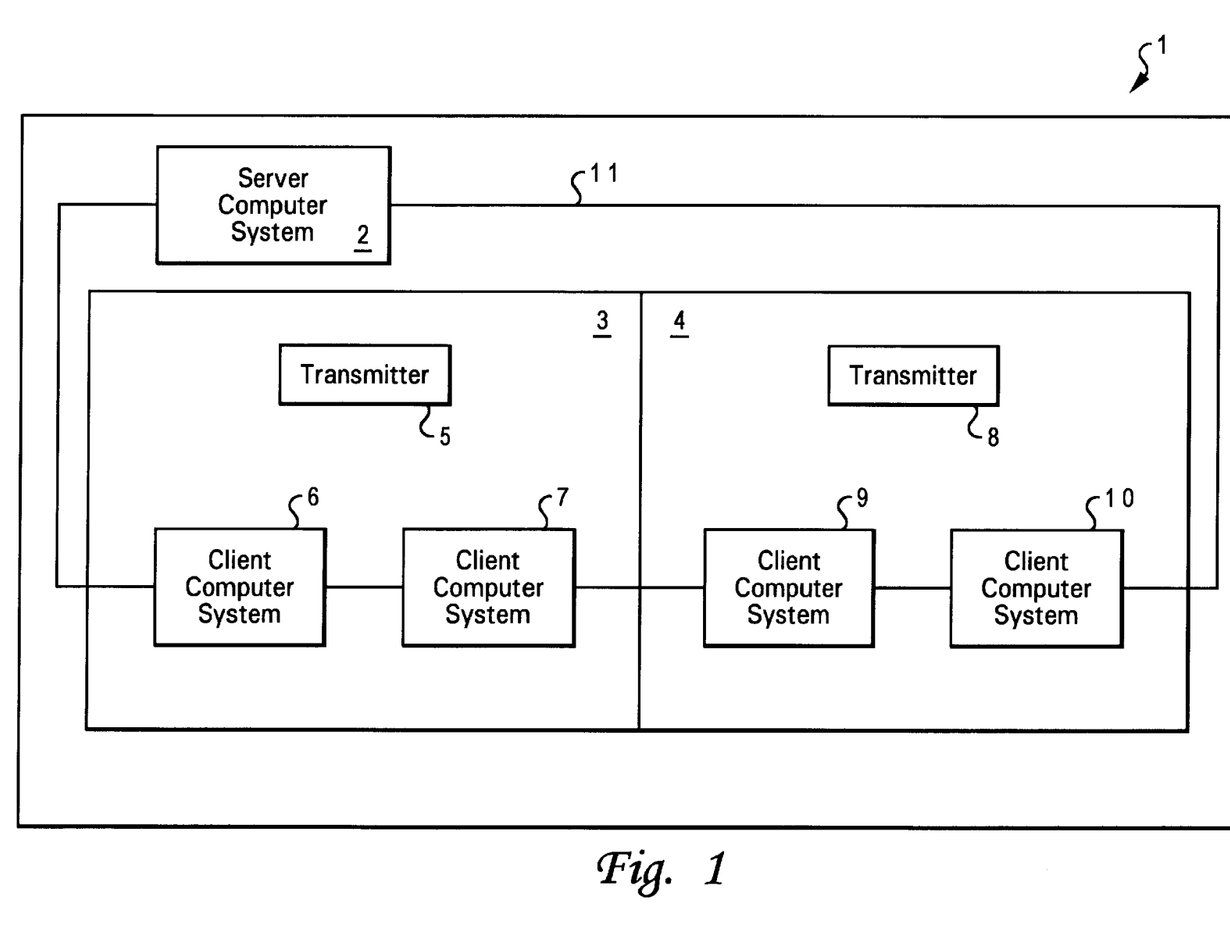
FIG. 1 depicts a high level block diagram of a data processing system 1 which includes a server computer system 2 and a plurality of client computer systems in accordance with the method and system of the present invention.

FIG. 1 depicts a high level block diagram of a data processing system 1 which includes a server computer system 2 and a plurality of client computer systems in accordance with the method and system of the present invention. Computer system 2 and the plurality of client computer systems are coupled together utilizing a local area network (LAN) 11. The computer systems have been placed within physical regions. Each physical region includes at least one transmitter. The transmitter in each physical region transmits a radio signal which is received by each computer system located within that physical region. The feature of transmitting a signal to a physical region is described fully in U.S. Pat. No. 5,712,973 issued on Jan. 27, 1998 which is incorporated herein by reference.

For example, computer systems 6 and 7, and transmitter 5 have been placed and are physically located within physical region 3. Computer systems 9 and 10, and transmitter 8 are physically located within physical region 4.

As an example, an inventory could be conducted to determine which computer systems are located within physical region 3. A wireless signal would be transmitted utilizing transmitter 5 to physical region 3. The signal would include a unique identifier associated with transmitter 5. In response to a receipt of this wireless signal, both computer systems 6 and 7 would provide an indication of their physical locations. In response to a receipt of the wireless signal, computer system 6 would transmit a signal which included the unique identifier associated with transmitter 5 and the unique identifier associated with computer system 6. And, in response to a receipt of the same wireless signal, computer system 7 would transmit a signal which included the unique identifier associated with transmitter 5 and the unique identifier associated with computer system 7. In this manner, all computer systems located within physical region 3 could be identified.

Figure 2:
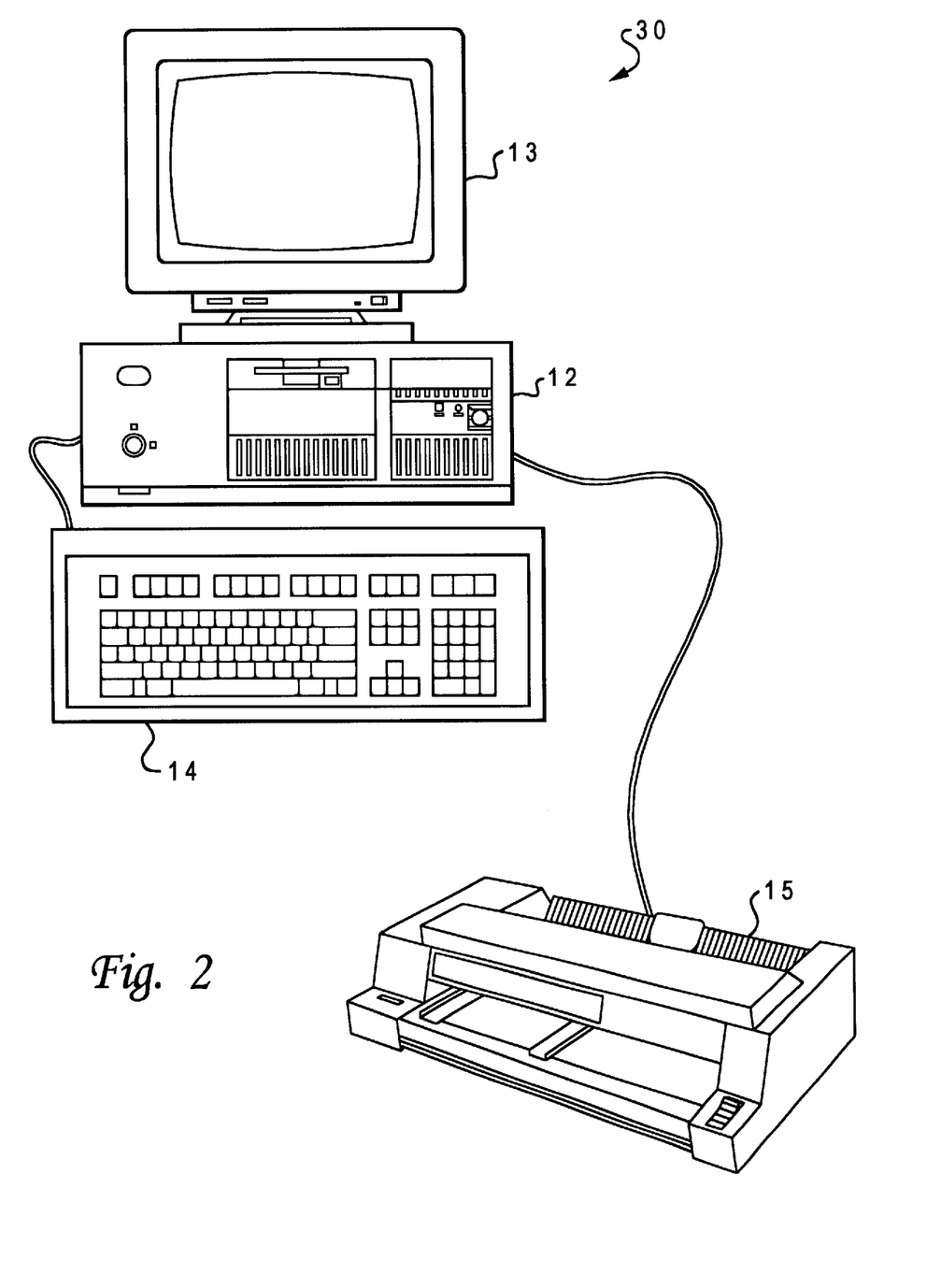
FIG. 2 illustrates a pictorial representation of a computer system which may be utilized to implement a server or client computer system described in FIG. 1 in accordance with the method and system of the present invention.

FIG. 2 illustrates a pictorial representation of a computer system which may be utilized to implement a server or client computer system described in FIG. 1 in accordance with the method and system of the present invention. Computer system 30 includes a computer 12, a monitor 13, a keyboard 14, and a printer or plotter 15. Computer system 30 may be utilized to implement any or all of server computer system 2 or client computer systems 6, 7, 9, or 10.

Figure 3:
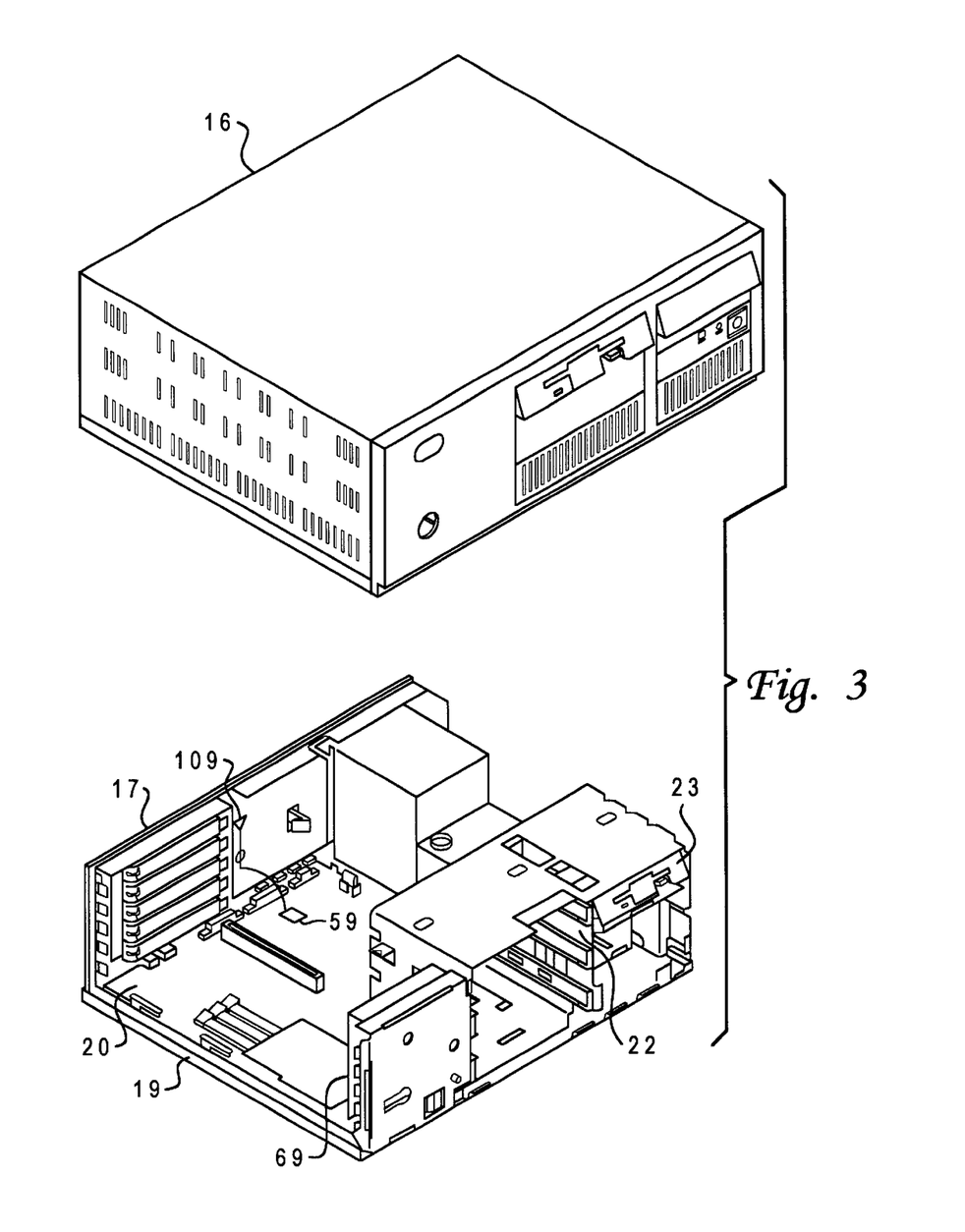
FIG. 3 depicts a pictorial representation of an exploded view of computer 12 in accordance with the method and system of the present invention.

FIG. 3 depicts a pictorial representation of an exploded view of computer 12 in accordance with the method and system of the present invention. Computer 12 has a cover 16 which cooperates with a chassis 19 in defining an enclosed shielded volume for receiving data processing and storage components for processing and storing digital data. At least certain of the system components are mounted on a multi-layer planar 20 (also commonly called a motherboard or system board) which is mounted on the chassis 19 and provides a means for mounting and electrically interconnecting various components of computer 12 including the CPU, system memory, and accessory cards or boards as is well known in the art.

Chassis 19 has a base and a rear panel 17 and defines at least one open bay 22 for receiving a data storage device such as a disk drive 23. An antenna 109 is mounted to extend outside computer 12 to collect radiation having a predefined characteristic. Antenna 109 is intended to provide a signal to system 30 indicating radiation having the predefined characteristic in the vicinity of computer system 30.

Figure 4:
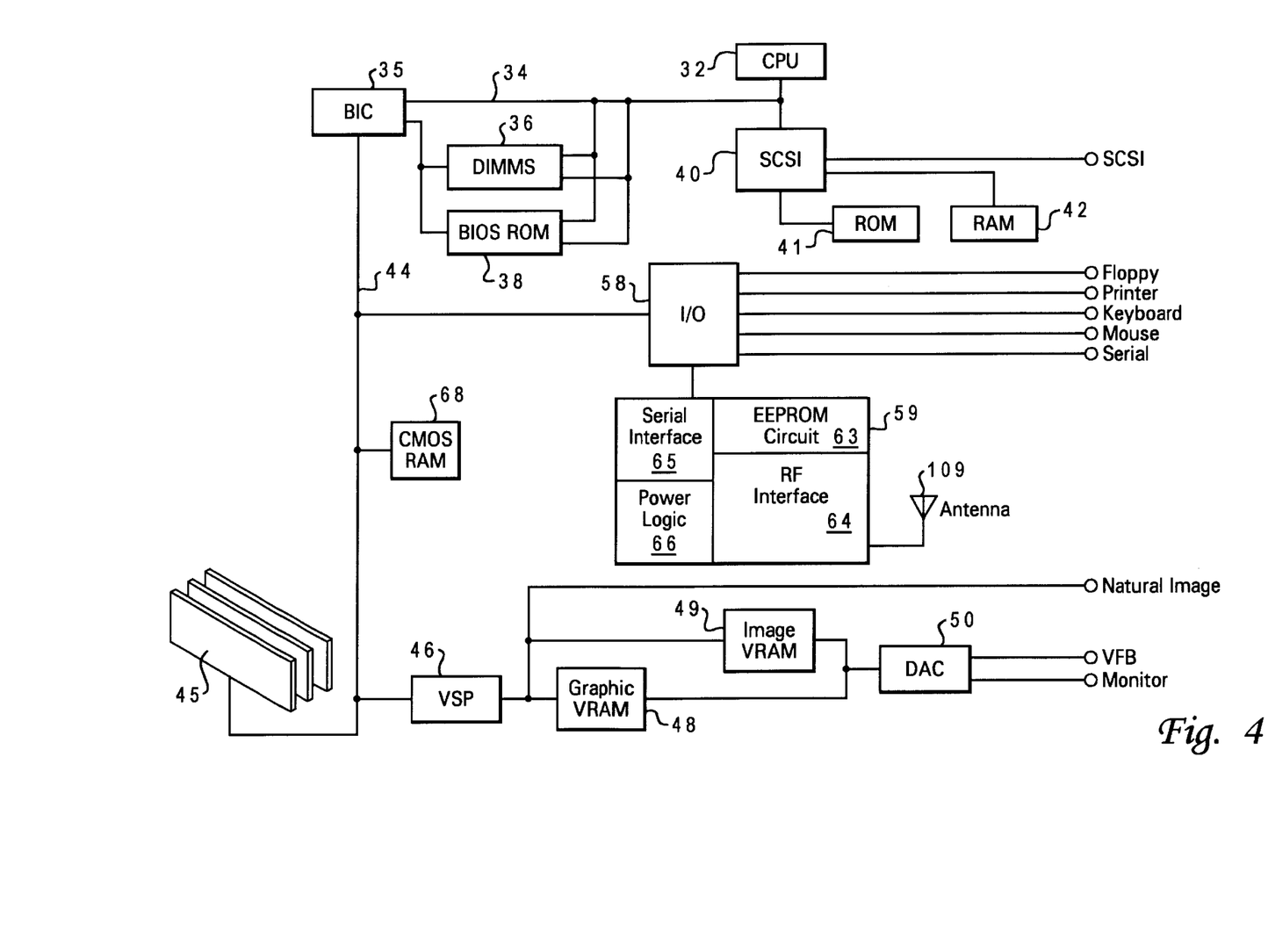
FIG. 4 illustrates a high level block diagram of computer system 30 illustrating the various components of computer system 30 in accordance with the method and system of the present invention.

FIG. 4 illustrates a high level block diagram of computer system 30 illustrating the various components of computer system 30 in accordance with the method and system of the present invention, including components mounted on the planar 20 and the connection of the planar to the I/O slots and other hardware of the personal computer system. Connected to the planar is the system processor 32. While any appropriate microprocessor can be used as the CPU 32, one suitable microprocessor is the Pentium which is sold by INTEL. The CPU 32 is connected by a high speed CPU local bus 34 to a bus interface control unit 35, volatile random access memory (RAM) 36 here shown as Dual Inline Memory Modules (DIMMS), and to BIOS ROM 38 in which is stored instructions for basic input/output operations to the CPU 32. The BIOS ROM 38 includes the BIOS that is used to interface between the I/O devices and the operating system of the microprocessor 32. Instructions stored in the BIOS ROM 38 can be copied into RAM 36 to decrease the execution time of BIOS. The system also has, as has become conventional, a circuit component which has battery backed non-volatile memory 68 (conventionally CMOS RAM) for receiving and retaining data regarding the system configuration and a real time clock (RTC).

While the present invention is described hereinafter with particular reference to the system block diagram of FIG. 4, it is to be understood at the outset of the description which follows that it is contemplated that the apparatus and methods in accordance with the present invention may be used with other hardware configurations of the planar board. For example, the system processor could be an INTEL Pentium or Pentium II microprocessor.

Returning again to FIG. 4, the CPU local bus 34 (comprising data, address, and control components) also provides for the connection of the microprocessor 32 with a Small Computer Systems Interface (SCSI) controller 40. The SCSI controller 40 may, as is known to persons skilled in the arts of computer design and operation, be connected or connectable with Read Only Memory (ROM) 41, RAM 42, and suitable internal or external devices of a variety of types as facilitated by the I/O connection indicated to the right in the Figure. The SCSI controller 40 functions as a storage controller in controlling storage memory devices such as fixed or removable media electromagnetic storage devices (also known as hard and floppy disk drives), electro-optical, tape and other storage devices.

Bus interface controller (BIC) 35 couples CPU local bus 34 with an I/O bus 44. By means of bus 44, BIC 35 is coupled with an optional feature bus such as a PCI bus having a plurality of I/O slots for receiving PCI adapter cards 45 which may be further connected to an I/O device or memory (not shown). The I/O bus 44 includes address, data, and control components.

Coupled along I/O bus 44 are a variety of I/O components such as a video signal processor 46 which is associated with video RAM (VRAM) for storing graphic information 48 and for storing image information 49. Video signals exchanged with the processor 46 may be passed through a Digital to Analog Converter (DAC) 50 to a monitor or other display device. Provision is also made for connecting the VSP 46 directly with what is here referred to as a natural image input/output, which may take the form of a video recorder/player, camera, etc.

The I/O bus 44 is coupled utilizing an input/output controller 58 to an associated Electrical Erasable Programmable Read Only Memory (EEPROM) 59. Conventional peripherals, such as floppy disk drives, a printer or plotter 15, keyboard 14 and a mouse or pointing device (not shown), are coupled to I/O bus 44 utilizing I/O controller 58.

EEPROM 59 includes an EEPROM circuit 63, a serial interface 65 for inputting and outputting signals, a radio frequency (RF) interface 64 for receiving wireless signals, and a power management logic circuit 66.

Figures 5, 9:
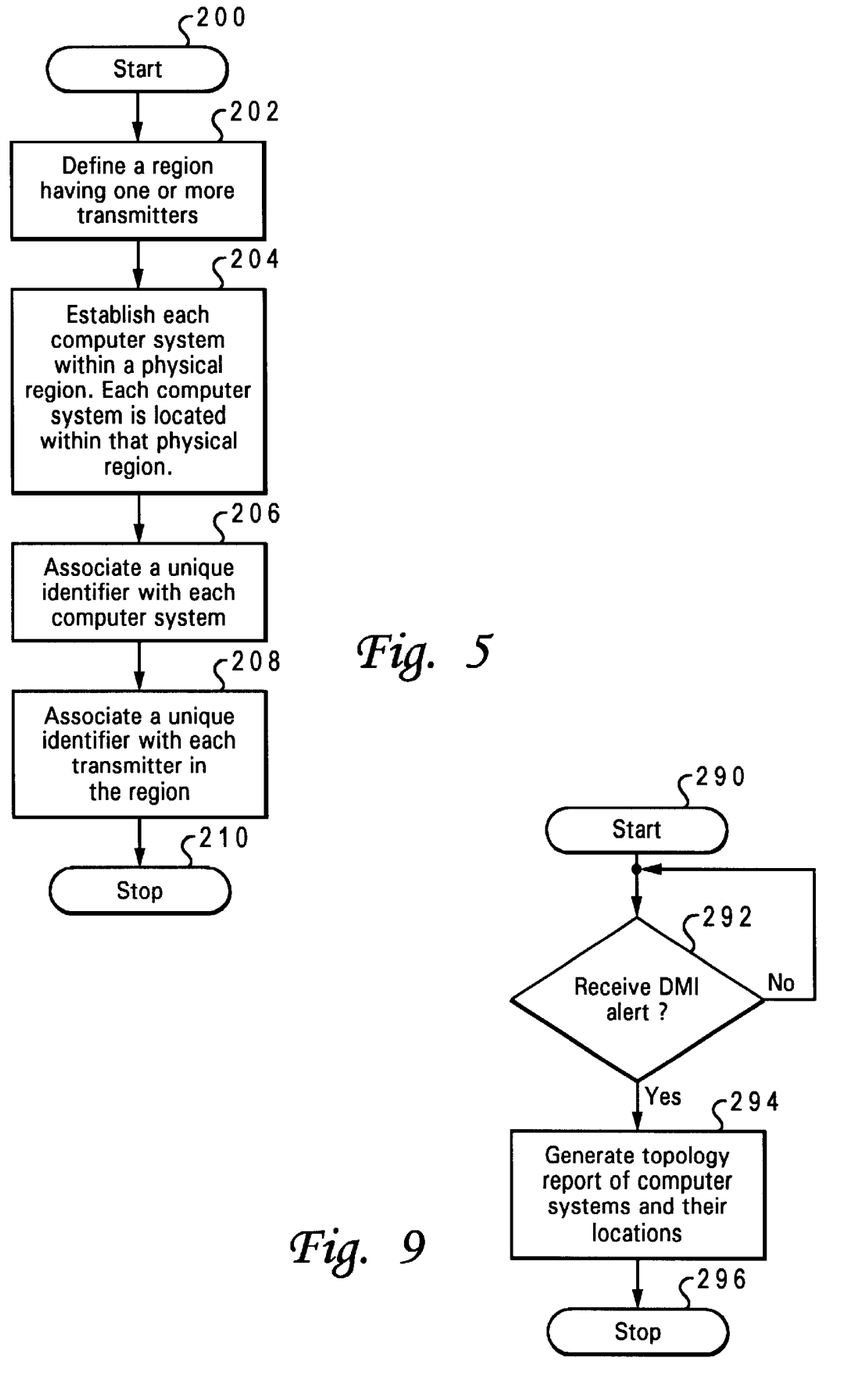
FIG. 5 depicts a high level flow chart which illustrates establishing a transmitter and computer systems within a defined physical region, and the association of unique identifiers with the transmitter and computer systems in accordance with the method and system of the present invention.
FIG. 9 depicts a high level flow chart which illustrates a server computer system receiving an indication of a client computer system's physical location in accordance with the method and system of the present invention.

FIG. 5 depicts a high level flow chart which illustrates establishing a transmitter and computer systems within a defined physical region, and the association of unique identifiers with the transmitter and computer systems in accordance with the method and system of the present invention. The process starts as depicted by block 200 and thereafter passes to block 202 which illustrates a definition of a physical region which includes at least one transmitter. Next, block 204 depicts an establishment of at least one, and typically many, computer systems within the physical region. Each computer system established within the physical region is located within the physical region. Thereafter, block 206 illustrates an association of a unique identifier with each computer system. Block 208 depicts an association of a unique identifier with each transmitter in the region. The process then terminates as illustrated by block 210.

Figure 6:
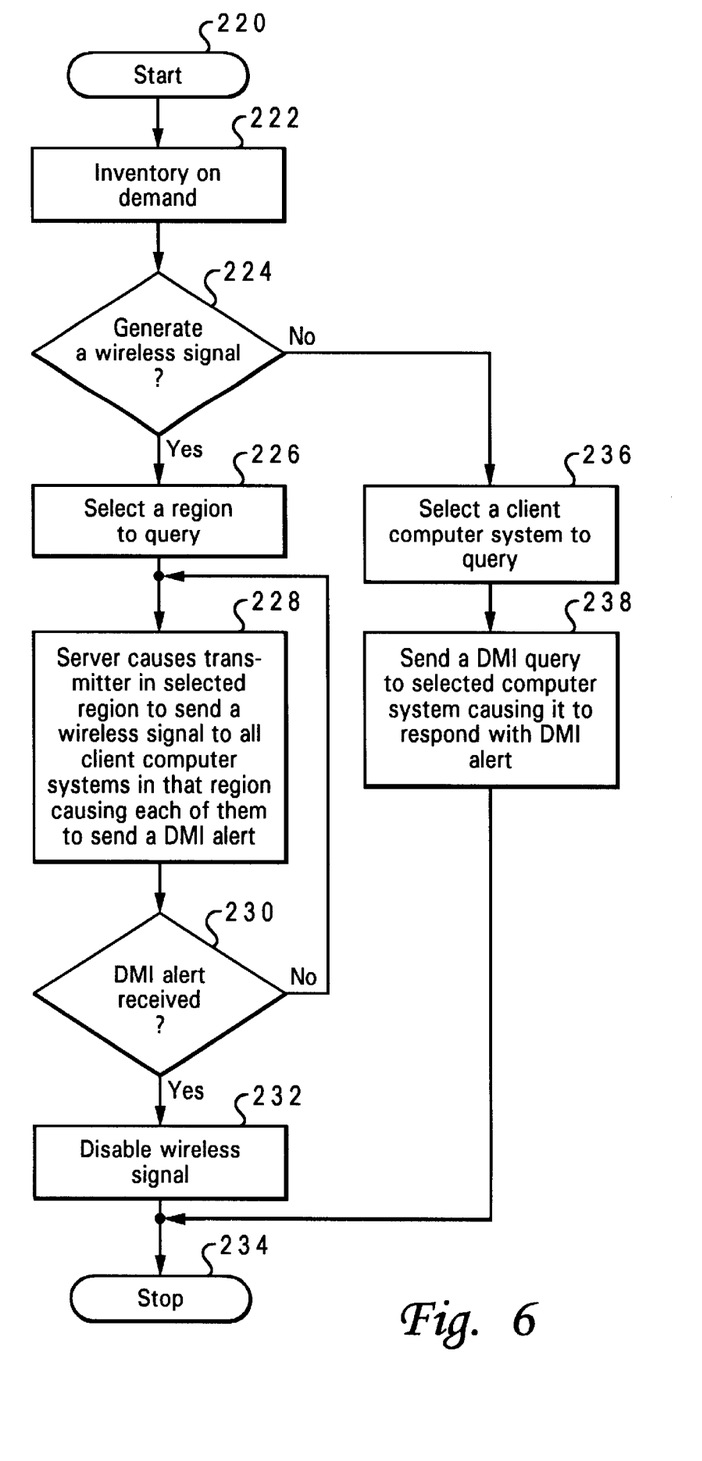
FIG. 6 illustrates a high level flow chart which depicts a server computer system generating a wireless signal to be transmitted to a physical region which includes at least one computer system in accordance with the method and system of the present invention.

FIG. 6 illustrates a high level flow chart which depicts a server computer system generating a wireless signal to be transmitted to a physical region which includes at least one computer system in accordance with the method and system of the present invention. The process starts as depicted by block 220 and thereafter passes to block 222 which illustrates a determination that an inventory on demand will be conducted. The process then passes to block 224 which depicts a determination of whether or not the inventory will be conducted by causing a transmitter to transmit a wireless signal. If a determination is made that the inventory will be conducted by causing a transmitter to transmit a wireless signal, the process passes to block 226 which illustrates a selection of a physical region to query.

Next, block 228 depicts a server causing the transmitter located within the selected physical region to transmit a wireless signal to that selected physical region. In response to a receipt of this wireless signal, each computer system located within the selected physical region will transmit an indication of its physical location by transmitting a DMI alert. The DMI alert is an industry standard format to send and receive information from a PC. The DMI alert includes the unique identifier associated with the transmitter associated with this physical region and the unique identifier of the computer system which transmits the DMI alert. The DMI alert is transmitted utilizing the local area network 11. Those skilled in the art will recognize that standards other than DMI may be utilized to transmit an indication of a physical location from a client computer system to its server computer system. When other methods are utilized to transmit an alert, the alert would still include the unique identifier associated with the transmitter associated with this physical region and the unique identifier of the computer system which is transmitting the alert.

Thereafter, block 230 illustrates a determination of whether or not a DMI alert has been received by the server computer system. If a determination is made that no DMI alert has been received, the process passes back to block 228. Referring again to block 230, if a determination is made that a DMI alert has been received, the process passes to block 232 which depicts the disabling of the transmission of the wireless signal. The process then terminates as illustrated by block 234.

Referring again to block 224, if a determination is made that the server computer system will not cause a transmitter to transmit a wireless signal in order to conduct the inventory, the process passes to block 236 so that the inventory may be completed utilizing a software command. Block 236 depicts a selection of a particular client computer system to query to determine its physical location. Thereafter, block 238 illustrates the server computer system sending a DMI query, or other type of network query, to the selected client computer system. The DMI query is sent to the selected computer system utilizing network 11. In response to a receipt of the DMI query, the selected client computer system will transmit a DMI alert utilizing network 11 to the server computer system. As described above, the DMI alert includes both the unique identifier associated with the transmitter which sent the most recently received wireless signal and the unique identifier associated with this computer system. The process then terminates as illustrated by block 234.

Figure 7:
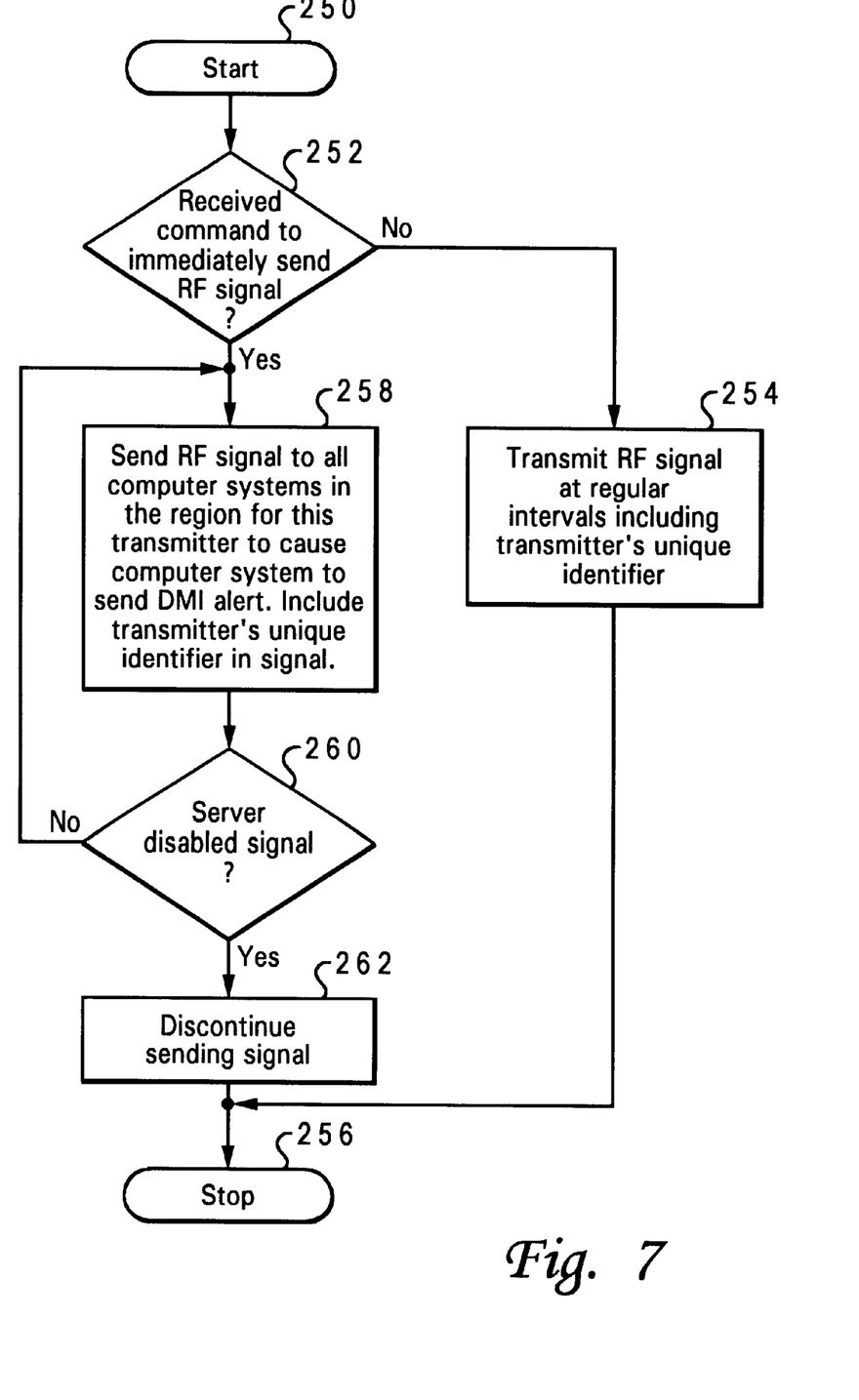
FIG. 7 depicts a high level flow chart which illustrates a transmitter established within a physical region transmitting a wireless signal to all computer systems located within the physical region within which the transmitter resides in accordance with the method and system of the present invention.

FIG. 7 depicts a high level flow chart which illustrates a transmitter established within a physical region transmitting a wireless signal to all computer systems located within the physical region within which the transmitter resides in accordance with the method and system of the present invention. Each transmitter within each physical region will execute the process illustrated by FIG. 7. The process starts as illustrated by block 250 and thereafter passes to block 252 which depicts a determination of whether or not the transmitter executing the process illustrated by FIG. 7 has received a command to transmit a wireless, RF, signal. If a determination is made that the transmitter has not received a command to immediately transmit a wireless signal, the process passes to block 254 which illustrates the transmitter transmitting a wireless signal at regular intervals which include the transmitter's unique identifier. The process terminates as depicted by block 256.

Referring again to block 252, if a determination is made that the transmitter has received a command to immediately transmit a wireless signal, the process passes to block 258 which depicts the transmitter transmitting a wireless, RF, signal to the physical region within which the transmitter is located. In response to a receipt of this wireless signal, each computer system located within the physical region will respond by transmitting a DMI alert. The process then passes to block 260 which illustrates a determination of whether or not the server computer system has disabled the signal. If a determination is made that the server computer system has not disabled the signal, the process passes back to block 258. Referring again to block 260, if a determination is made that the server computer system has disabled the signal, the process passes to block 262 which depicts the transmitter discontinuing the transmission of the signal. The process then terminates as illustrated by block 256.

Figure 8:
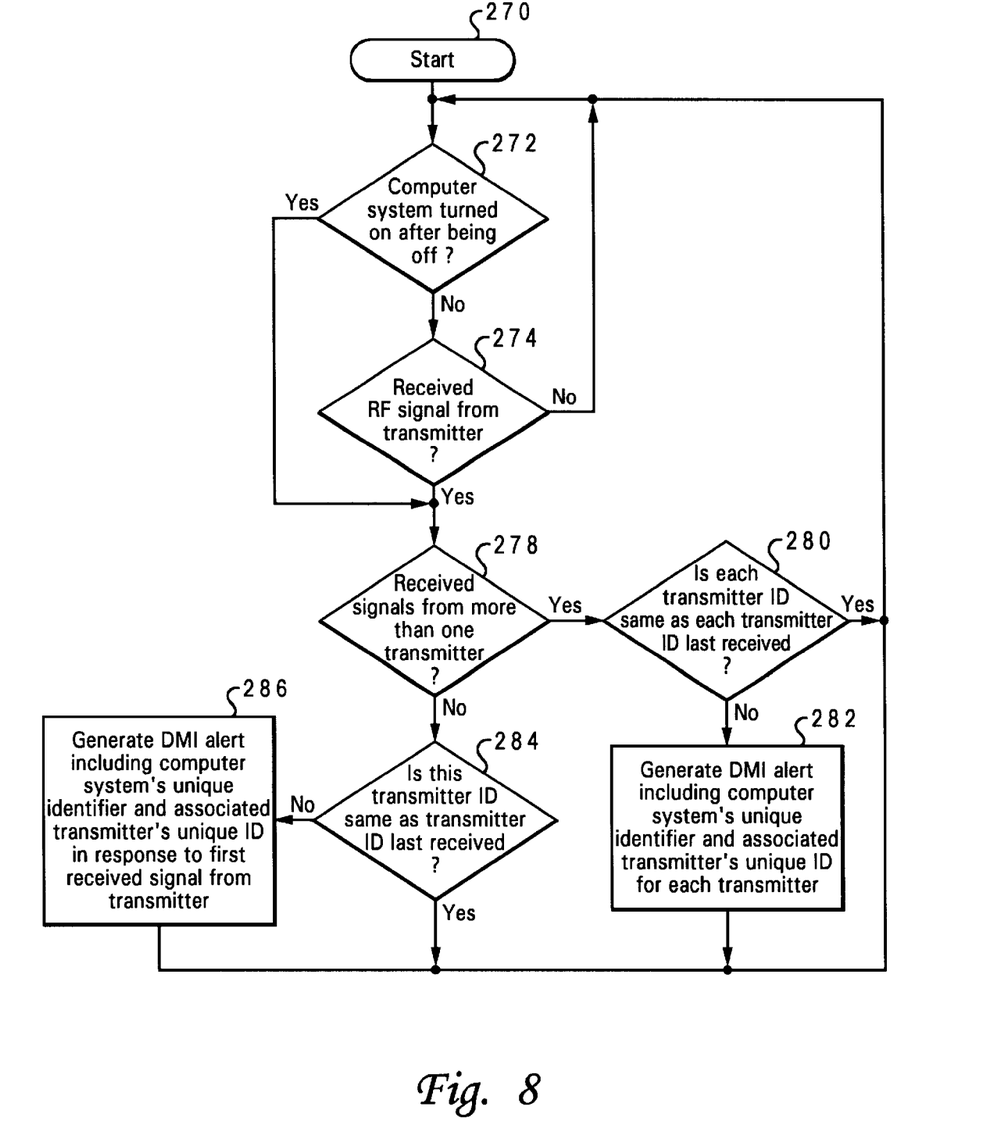
FIG. 8 illustrates a high level flow chart which depicts a computer system transmitting an indication of the computer system's physical location in accordance with the method and system of the present invention.

FIG. 8 illustrates a high level flow chart which depicts a computer system transmitting an indication of the computer system's physical location in accordance with the method and system of the present invention. Each computer system included within each physical region will execute the process illustrated by FIG. 8. The process starts as depicted by block 270 and thereafter passes to block 272 which illustrates a determination of whether or not the computer system executing the process of FIG. 8 has been turned on after being off. If a determination is made that the computer system has been turned on after being off, the process passes to block 278. Referring again to 272, if a determination is made that the computer system has not been turned on after being off, the process passes to block 274 which illustrates a determination of whether or not this computer system received a wireless signal from the transmitter which causes the computer system to generate a DMI alert. If a determination is made that the computer system has received a wireless signal causing the computer system to generate a DMI alert, the process passes to block 278. Referring again to block 274, if a determination is made that the computer system has not received a wireless signal causing the computer system to generate a DMI alert, the process passes to block 272.

Block 278 illustrates a determination of whether or not the computer system has received a wireless signal from more than one transmitter. If a determination is made that the computer system received a signal from more than one transmitter, the process passes to block 280 which depicts a determination of whether or not each unique identifier received from each transmitter is the same as each unique identifier received from each transmitter during the last received transmission from each transmitter. If a determination is made that each unique identifier received from each transmitter is the same as each unique identifier received from each transmitter during the last received transmission from each transmitter, the process passes to block 272. In this manner, a determination has been made by comparing the unique identifiers of the transmitters that the computer system has not been moved out of the physical region it was in. This determination is made because the received unique identifiers are the same as the unique identifiers last received.

Referring again to block 280, if a determination is made that each unique identifier received from each transmitter is not the same as each unique identifier received from each transmitter during the last received transmission from each transmitter, the process passes to block 282. In this manner, a determination has been made by comparing the unique identifiers of the transmitters that the computer system has been moved out of the physical region it was in. This determination is made because the received unique identifiers are not the same as the unique identifiers last received. Block 282 illustrates a generation of a DMI alert. The DMI alert includes the computer system's unique identifier as well as the unique identifier for each transmitter which transmitted this signal just received by this computer system. The process then passes to block 272.

Referring again to block 278, if a determination is made that the computer system did not receive a signal from more than one transmitter, the process passes to block 284 which depicts a determination of whether or not the unique identifier for the transmitter which transmitted this signal is the same as the unique identifier for the transmitter which transmitted the last received signal. If a determination is made that the unique identifier for the transmitter which transmitted this signal is the same as the unique identifier for the transmitter which transmitted the last received signal, the process passes to block 272. Referring again to block 284, if a determination is made that the unique identifier for the transmitter which transmitted this signal is not the same as the unique identifier for the transmitter which transmitted the last received signal, the process passes to block 286 which depicts the computer system generating a DMI alert. The DMI alert includes the computer system's unique identifier as well as the unique identifier for the transmitter which transmitted the last signal received by this computer system. The process then passes to block 272.

FIG. 9 depicts a high level flow chart which illustrates a server computer system receiving an indication of a client computer system's physical location in accordance with the method and system of the present invention. The process starts as illustrated by block 290 and thereafter passes to block 292 which depicts a determination of whether or not the server computer system has received a DMI alert. If a determination is made that the server computer system has not received a DMI alert, the process passes back to block 292. Referring again to block 292, if a determination is made that the server computer system has received a DMI alert, the process passes to block 294 which depicts the server computer system generating a topology report of the computer systems and their locations. The process then terminates as illustrated by block 296.

While a preferred embodiment has been particularly shown and described, it will be understood by those skilled in the art that various changes in form and detail may be made therein without departing from the spirit and scope of the present invention.

What is claimed is:

1. A method in a data processing system for determining a physical location of a client computer system, said data processing system including a plurality of client computer systems physically coupled to a server computer system via a physical network, said method comprising the steps of:

transmitting a wireless signal utilizing a transmitter to a physical region within which said plurality of computer systems are physically located, wherein said plurality of client computer systems receive said wireless signal, said transmitter being physically separate and apart from said server computer system; and in response to a receipt of said wireless signal, each of said plurality of computer systems transmitting an indication of its physical location to said server computer system utilizing said physical network.

2. The method according to claim 1, wherein said step of transmitting a wireless signal to said physical region further comprises the step of transmitting a wireless signal utilizing said transmitter located within said physical region, said transmitter being associated with said physical region and having an associated unique identifier which identifies only said transmitter.

3. The method according to claim 2, further comprising the step of associating each of said plurality of client computer systems with a different unique identifier, wherein said different unique identifier is utilized to specify only one of said plurality of client computer systems.

4. The method according to claim 3, wherein said step of each of said plurality of client computer systems transmitting an indication further comprises the step of each of said plurality of client computer systems located within said physical region transmitting an indication including said unique identifier which identifies only said transmitter and said different unique identifier associated with each of said plurality of client computer systems to said server computer system utilizing a DMI alert command via said physical network.

5. The method according to claim 4, further comprising the step of determining a physical region within which each of said plurality of client computer system is located utilizing said unique identifier which identifies only said transmitter and said different unique identifier associated with each of said plurality of client computer systems.

6. The method according to claim 5, further comprising the step of generating a topology report including a physical location for each of said plurality of client computer systems.

7. The method according to claim 6, wherein said data processing system further includes a second physical region within which a second plurality of client computer systems reside and wherein said step of transmitting a wireless signal to a physical region further includes the step of transmitting a wireless signal to said first and second physical regions, wherein said first and second plurality of client computer systems receive said wireless signal, and further wherein in response to a receipt of said wireless signal, each of said first and second plurality of client computer systems transmitting an indication of its physical location to said server computer system utilizing said physical network.

8. A method in a data processing system including a plurality of physical regions for determining a physical location of a client computer system, said data processing system including a plurality of client computer systems physically coupled to a server computer system via a physical network, said method comprising the steps of:

transmitting a wireless signal utilizing a transmitter at regular intervals to one of said plurality of physical regions, said transmitter being separate and apart from said server computer system; and in response to an entry of one of said plurality of client computer systems into said one of said plurality of physical regions from outside of said one of said plurality of physical regions and a receipt of said transmitted wireless signal, said one of said plurality of client computer systems transmitting an indication of its physical location to said server computer system utilizing said physical network.

9. The method according to claim 8, further comprising the step of determining if said one of said plurality of client computer systems has entered said one of said plurality of physical regions.

10. The method according to claim 9, further comprising the step of each of said plurality of physical regions including said transmitter for transmitting wireless signals to each of said plurality of physical regions, each said transmitter having an associated unique identifier which identifies only each said transmitter, wherein said wireless signals transmitted by each said transmitters includes said unique identifier.

11. The method according to claim 10, further comprising the step of in response to a receipt of said wireless signal, said client computer system comparing a unique identifier identifying a transmitter which transmitted said wireless signal and a unique identifier identifying a transmitter which transmitted a wireless signal last received by said client computer system.

12. The method according to claim 11, wherein said step of determining of said one of said plurality of client computer systems has entered said one of said plurality of physical regions further comprises the step of in response to said unique identifier identifying said transmitter which transmitted said wireless signal being the same as said unique identifier identifying a transmitter which transmitted a wireless signal last received, said one of said plurality of client computer systems transmitting an indication of its physical location to said server computer system utilizing a DMI alert command utilizing said physical network.

13. A data processing system for determining a physical location of a client computer system, said data processing system including a plurality of client computer systems physically coupled to a server computer system via a physical network, comprising:

means for transmitting a wireless signal utilizing a transmitter to a physical region within which said plurality of client computer systems are physically located, wherein said plurality of client computer systems receive said wireless signal, said transmitter being separate and apart from said server computer system; and means responsive to a receipt of said wireless signal, for each of said plurality of computer systems transmitting an indication of its physical location to said server computer system utilizing said physical network.

14. The system according to claim 13, wherein said means for transmitting a wireless signal to said physical region further comprises means for transmitting a wireless signal utilizing said transmitter located within said physical region, said transmitter having an associated unique identifier which identifies only said transmitter.

15. The system according to claim 14, further comprising means for associating each of said plurality of client computer systems with a different unique identifier, wherein said different unique identifier is utilized to specify only one of said plurality of client computer systems.

16. The system according to claim 15, wherein said means for each of said plurality of client computer systems transmitting an indication further comprises means for each of said plurality of client computer systems located within said physical region transmitting an indication including said unique identifier which identifies only said transmitter and said different unique identifier associated with said each of said plurality of client computer systems to said server computer system utilizing a DMI alert command via said physical network.

17. The system according to claim 16, further comprising means for determining a physical region within which each of said plurality of client computer system is located utilizing said unique identifier which identifies only said transmitter and said different unique identifier associated with said each of said plurality of client computer systems.

18. The system according to claim 17, further comprising means for generating a topology report including a physical location for each of said plurality of client computer systems.

19. The system according to claim 18, wherein said data processing system further includes a second physical region within which a second plurality of client computer systems reside and wherein said means for transmitting a wireless signal to a physical region further includes means for transmitting a wireless signal to said first and second physical regions, wherein said first and second plurality of client computer systems receive said wireless signal, and further wherein responsive to a receipt of said wireless signal, each of said first and second plurality of client computer systems transmitting an indication of its physical location to said server computer system utilizing said physical network.

20. A data processing system including a plurality of physical regions for determining a physical location of a client computer system, said data processing system including a plurality of client computer systems physically coupled to a server computer system via a physical network, comprising:

means for transmitting a wireless signal utilizing a transmitter at regular intervals to one of said plurality of physical regions, said transmitter being separate and apart from said server computer system; and means responsive to an entry of one of said plurality of client computer systems into said one of said plurality of physical regions from outside of said one of said plurality of physical regions and a receipt of said transmitted wireless signal, for said one of said plurality of client computer systems transmitting an indication of its physical location to said server computer system utilizing said physical network.

21. The system according to claim 20, further comprising means for determining if said one of said plurality of client computer systems has entered said one of said plurality of physical regions.

22. The system according to claim 21, further comprising means for each of said plurality of physical regions including said transmitter for transmitting wireless signals to each of said plurality of physical regions, each said transmitter having an associated unique identifier which identifies only each said transmitter, wherein said wireless signals transmitted by each said transmitters includes said unique identifier.

23. The system according to claim 22, further comprising means responsive to a receipt of said wireless signal, for said client computer system comparing a unique identifier identifying a transmitter which transmitted said wireless signal and a unique identifier identifying a transmitter which transmitted a wireless signal last received by said client computer system.

24. The system according to claim 23, wherein said means for determining of said one of said plurality of client computer systems has entered said one of said plurality of physical regions further comprises means responsive to said unique identifier identifying said transmitter which transmitted said wireless signal being the same as said unique identifier identifying a transmitter which transmitted a wireless signal last received, for said one of said plurality of client computer systems transmitting an indication of its physical location to said server computer system utilizing a DMI alert command utilizing said physical network.

* * * * *